(No Model.)
H. L. SMITH.
VEHICLE WHEEL.
No. 384,398. Patented June 12, 1888.
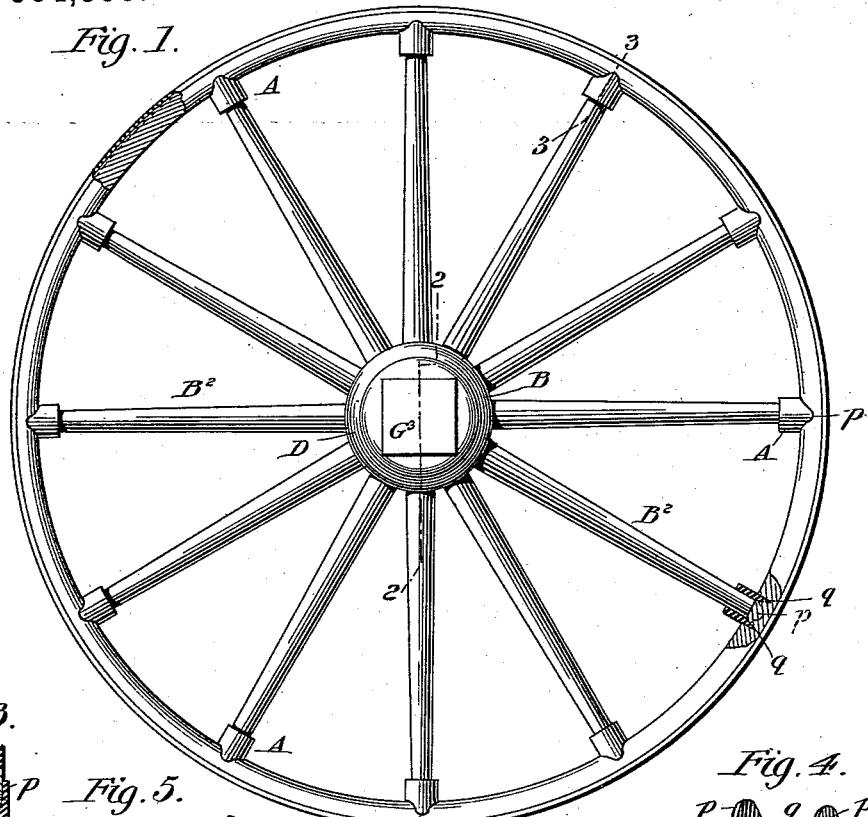
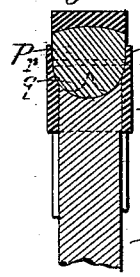
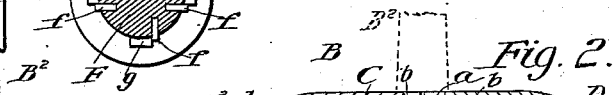
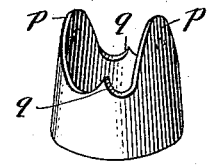
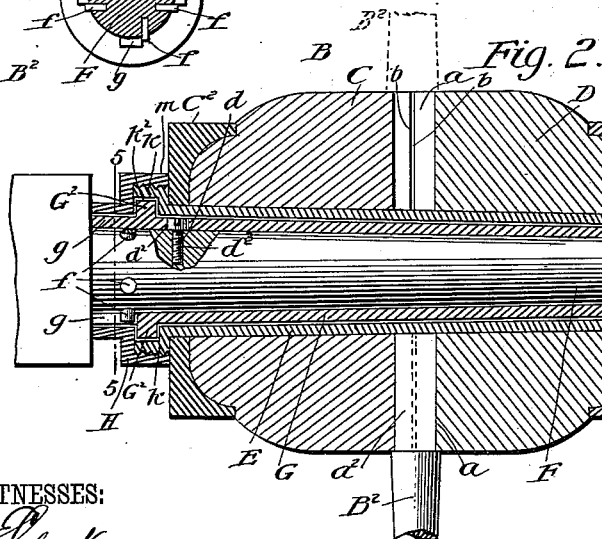
WITNESSES:
INVENTOR:
H. L. Smith
BY Munn & Co
ATTORNEYS.

UNITED STATES PATENT OFFICE.

HENRY LAMBERT SMITH, OF JERICHO CENTRE, VERMONT.

VEHICLE-WHEEL.

SPECIFICATION forming part of Letters Patent No. 384,398, dated June 12, 1888.

Application filed November 16, 1887. Serial No. 255,282. (No model.)

*To all whom it may concern:*

Be it known that I, HENRY LAMBERT SMITH, of Jericho Centre, in the county of Chittenden and State of Vermont, have invented a new and Improved Vehicle Wheel and Axle, of which the following is a full, clear, and exact description.

The present invention relates to improvements in the construction of a vehicle-wheel, and also of the axle relatively thereto, the object whereof being to increase the durability of the wheel and axle, enabling a ready and easy attachment of the one upon the other, securing an even wearing of the wheel upon the axle, and on any occasion arising for repairing the wheel enabling such to be most readily performed; and it consists in the construction and formation of the wheel, and also of the axle in relation thereto, all substantially as will be hereinafter more fully described, and pointed out in the claims.

Reference is to be had to the accompanying drawings, forming a part of this specification, in which similar letters of reference indicate corresponding parts in all the figures.

Figure 1 is a face view of a vehicle with portions thereof broken away or in section. Fig. 2 is an enlarged central longitudinal section through the hub and axle on the line 2 3 of Fig. 1. Fig. 3 is an enlarged sectional view of a felly, tire, and portion of a spoke on line 3 3 of Fig. 1. Fig. 4 is an enlarged perspective view of the form of clip employed for connecting the spoke to the felly, and Fig. 5 is a cross-section of the axle on line 5 5 of Fig. 2.

The connection of the spoke with the felly and hub is by means of a clip, A, at the felly, and a formation of the two-part hub B enabling its mortises or sockets $a$ to be widened and contracted to bind on the tenon $a^2$ of the spoke $B^2$, and the said hub is formed of the two sections or parts C D, with their inner faces or ends, $b$, meeting or lying in proximity to each other in a plane or planes at right angles to the axis, an axial sleeve, E, passing through them and projecting beyond their outer ends and through the metal head-plates $C^2$ $D^2$.

The axle-spindle F is provided with a wear-thimble, G, exteriorly screw-threaded at its outer end to receive a nut, $G^3$, and having a shoulder or flange, $G^2$, at its rear portion, said wear-thimble being of a form and size to fit and project through the bore of hub-sleeve E, being fastened on the axle-spindle F by a screw, $d$, passing radially through its screw-hole $d^2$ into a screw-socket, $d^3$, in the spindle, thereby preventing it from longitudinal displacement, and it is confined against rotation by said screw in part; but said confinement is to a greater extent insured by the axle-spindle being provided with short radial projecting studs or shoulders $f$ and the thimble with rearwardly-extending abutments $g$, certain of said studs being arranged in relation to certain of said abutments in positions that would prevent any rotation of the thimble-abutments by them in one direction, and certain other of said studs being arranged in relation to certain other of said abutments in positions that would prevent any rotation of the thimble-abutments by them in the opposite direction, as will be understood on reference to Fig. 5.

The sleeve E, passing through the hub sections C D, at its outer end is exteriorly screw-threaded, as at $h$, for engagement with the threaded central aperture of the outer head-plate, $D^2$, the rear end of said sleeve being offset and flanged, as at $k$, to form an annular opening or enlargement, $k^2$, by which to lie over the shoulder $G^2$ of the wear-thimble G, the face of said flange lying against the outer face of the inner head-plate, $C^2$. Said flange is screw-threaded on its outer periphery. A collar, H, with an exteriorly-disposed and forwardly-projecting annular flange, $m$, interiorly screw-threaded, is adapted to lie over the shank of the axle-spindle, or upon the abutments $g$ of the wear-thimble behind its flange $G^2$, and by its said screw-threaded flange $m$ to engage the screw-threads on the flange of the hub-sleeve. Thus it will be seen that the hub-sleeve confines the hub-sections together against the spokes clamped between them in the mortises or sockets in their inner faces; that said sleeve may rotate on the axle or the wear-thimble thereof; that the collar H, lying by its inner annular edge about and behind the shoulder or flange $G^2$ of wear-thimble, and by its forwardly-extended interiorly-screw-threaded flange $m$ engaging the exterior screw-threads on the flanged hub-sleeve, prevents longitudinal displacement of the hub, and the construction of pins or studs on axle-spindle and the abutments $g$ on axle-thimble and the screw passing through axle-thimble into said spindle form a certain and effective means of attachment of the wear-thimble for use, and one that will readily permit of its being changed on the axle-spindle to present different portions of its periphery uppermost and to the greatest wear from time to time, as desirable for an even wearing of the thimble and a steady running of the wheel.

The clips A are adapted to receive or embrace the outer ends of the spokes, and are provided at their outer ends with lips $p$, adapted to lie over the sides of the felly, and between said lips $p$ the edges of its annular walls are concave, or of generally rounding contour, corresponding to that of the inner edge of the felly in cross section, except that at the central part of said concave portions outwardly-projecting spurs $q$ are formed integrally with the metal of the clip, and when the spoke has been entered and clamped within a hub socket with a clip upon and about its outer end portion, which is concaved to fit on the inner rim of the felly, the clip is driven outwardly in a manner to force its spurs $q$ firmly into the wood of said felly, and, if desired, rivets may be passed through the lips $p$ through and across the thickness of the felly, as indicated at $r$.

Should it be found necessary to tighten the felly or to take up any lash between the ends of the spokes and the inner periphery of the felly, the clips A may be readily detached from their engagement with the felly and a thickness of leather or other packing interposed, when the clip may be replaced in its securing position.

Having thus fully described my invention, I claim as new and desire to secure by Letters Patent—

1. The combination, with the spindle F and the stationary thimble G, inclosing the same and having its outer end threaded, and an annular shoulder, $G^2$, near its inner end, of the hub formed of two sections, C D, the inner adjacent faces of which are recessed to form spoke-sockets, the sleeve E, extending through said hub-sections, provided with external screw-threads, $h$, at its outer end beyond the section D, and provided with a screw-threaded offset at its rear end, as at $k$, to receive the shoulder $G^2$, the inner head-plate, $C^2$, abutting against the shoulder formed by the offset $k$, the outer plate, $D^2$, screwed on the outer end of sleeve E against the outer section, D, the nut $G^3$, screwed upon the outer end of the stationary thimble G and bearing against the plate $D^2$, and the offset collar H, screwed upon the offset $k$, and extending along the inner end of the thimble, substantially as set forth.

2. In a wheel, the combination, with the felly having a convex inner face and a spoke having a concave outer end resting against the convex face of the felly, of the tubular open-ended socket upon the concave end of the spoke and formed with lips $p\,p$, to embrace the sides of the felly, and with opposite spurs, $q\,q$, on the edge, between the lips, to enter the convex face of the felly, substantially as set forth.

HENRY LAMBERT SMITH.

Witnesses:
H. L. MURDOCK,
PETER GOMO.